Feb. 1, 1966   B. H. CARLISLE   3,232,316
FLUID CONTROL VALVE

Filed Sept. 12, 1963   2 Sheets-Sheet 1

INVENTOR.
BENJAMIN H. CARLISLE
BY
Andrus & Starke
ATTORNEYS

Feb. 1, 1966  B. H. CARLISLE  3,232,316
FLUID CONTROL VALVE
Filed Sept. 12, 1963  2 Sheets-Sheet 2
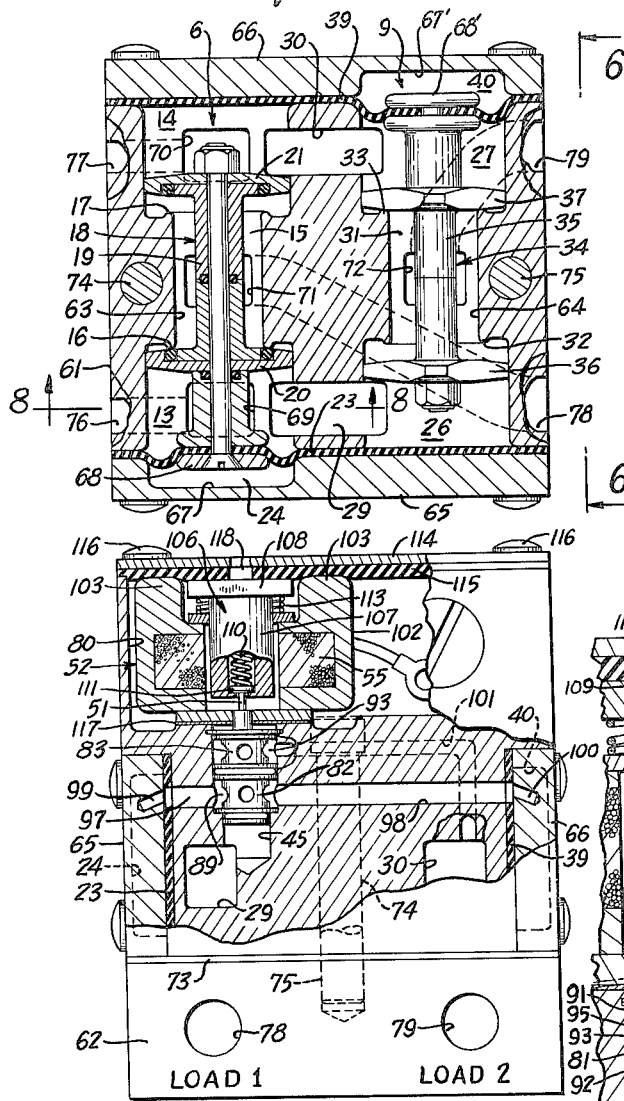
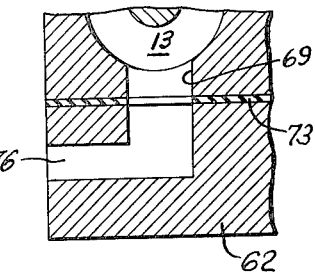
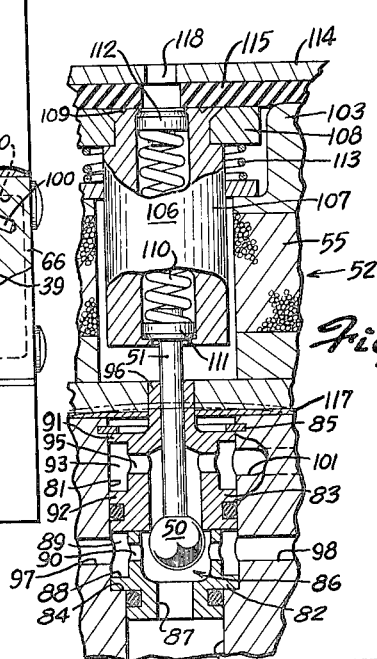
INVENTOR.
BENJAMIN H. CARLISLE
BY
Andrus & Starke
ATTORNEYS United States Patent Office 3,232,316
Patented Feb. 1, 1966

3,232,316
FLUID CONTROL VALVE
Benjamin H. Carlisle, Freeport, Ill., assignor to The Clark Controller Company, Cleveland, Ohio, a corporation of Ohio
Filed Sept. 12, 1963, Ser. No. 308,384
14 Claims. (Cl. 137—596.15)

This invention relates to a fluid control valve and particularly a line responsive valve having a pilot operated control.

Many control applications employ fluid controls for fluid operating means with suitable interconnecting pilot valving for selectively supplying and exhausting an operating fluid with respect to a fluid operable load or loads. Spot welders, for example, employ a pilot valve controlling the pressure and exhaust connections to air cylinders for rapidly positioning the electrodes for loading and welding positions. The direct control of fluid flow by solenoid valves is generally impractical in such application because of the size. Further, the hammer effect encountered in rapidly stopping the movement of the moving fluid prevents obtaining long valve life, particularly because of the deterioration of the valve seats. As a result, pilot valves have been generally employed which can employ relatively small electromagnetic actuators and the like.

The present invention is particularly directed to a four-way line responsive valve having a control diaphragm defining a pressurized control chamber. The incoming pressure is connected to bias the valve to a predetermined position, and selectively to the control chamber to selectively reverse position the valve. A pilot valve is provided for the operable connection of the control chamber with the line pressure.

The present invention further is particularly directed to a pair of similar dual positioned valves biased to a first position established by line pressure and each having a pressure control unit responsive to line pressure therein to establish a second valve position in combination with a pilot valve for selectively and simultaneously connecting the diaphragmed valve chambers to the inlet pressure and to an exhaust. The similar dual positioned valves are oppositely biased and interconnected to the incoming line and to an exhaust in series.

In a preferred construction, spaced, parallel poppet valves are provided in a housing, with each including an inlet chamber and an exhaust chamber connected by an outlet or load passageway valved at the opposite ends. The load is interconnected to the connecting passageway for selective connection to the inlet chamber and the exhaust chamber. A diaphragm control chamber is provided adjacent the inlet chamber of the first valve and includes a diaphragm forming a common end wall of the inlet chamber and the control chamber. In the second valve, a diaphragm control chamber is provided in alignment with the exhaust chamber and having a diaphragm defining a common wall therebetween. The diaphragm chambers are interconnected through a pilot valve to the connecting passageway between the connecting line passageway and exhaust passageway between the first and second valves. In the preferred construction, a small ball check pilot valve is formed within the housing and includes a common inlet-outlet connected to the diaphragm control chambers, an intake port connected to the inlet pressure and an exhaust outlet connected to the exhaust system of the poppet valves. The incoming line pressure biases the ball check to close the exhaust line connection and thereby open the pilot valve to transmit the line pressure to the diaphragm chambers and thereby establish a first operating position. A small magnetic operator is coupled to the ball check to positively overcome the incoming line pressure and to thereby close the incoming line connection and to interconnect the diaphragmed chamber connections to the exhaust passage.

The present invention provides a small, compact four-way valve assembly which can be incorporated into a single block body having the various passageways provided within the assembly. An electromagnetic pilot valve can be provided in a novel manner within the body with safety or interlock cover or securement means permitting manual operation and the like.

The drawings furnished herewith illustrate the best mode presently contemplated for carrying out the invention.

In the drawings:

FIG. 5 is a horizontal section taken on line 5—5 of FIG. 3;

FIG. 6 is a side elevational view of FIG. 5 with parts broken away and sectioned to more clearly illustrate the components;

FIG. 7 is an enlarged fragmentary vertical section of FIG. 6 showing more clearly the illustrated pilot valve; and FIG. 8 is a fragmentary sectional view taken generally along line 8—8 of FIG. 5.

Figure 1:
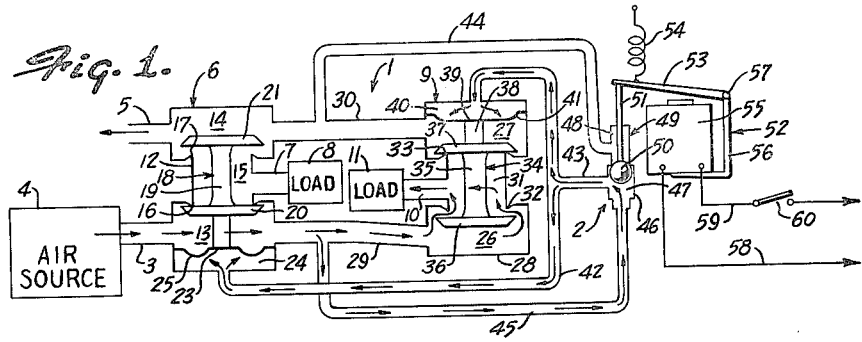
FIGURE 1 is a diagrammatic illustration of a four-way line responsive and pilot controlled valve unit constructed in accordance with the present invention.

Referring to the drawings and particularly to FIGURE 1, a four-way air valve unit 1 is illustrated interconnected with an electroresponsive pilot valve unit 2. An air inlet line 3 is connected to the four-way air valve unit 1 and to a compressed air source 4, shown diagrammatically. An exhaust line 5 is shown connected to the four-way valve unit 1 and may be connected to any suitable exhaust such as the surrounding atmosphere or a recovery chamber. The illustrated four-way air valve unit 1 includes a first main air valve 6 having an outlet 7 connected to a suitable load 8 shown diagrammatically in block diagram and a second valve 9 having an outlet 10 connected to supply operating air to a load 11 similarly shown in block diagram. The valves 6 and 9 are similarly constructed of a diaphragm type and interconnected to the incoming air line 3 and the pilot valve unit 2 to alternately supply air pressure to the respective loads 8 and 11.

The first valve 6 includes a valve housing 12 having an inlet chamber 13 at one end and an exhaust chamber 14 at the opposite end connected respectively to the inlet line 3 and the exhaust line 5. The inlet chamber 13 and exhaust chamber 14 are further connected by a bridging or connecting valved passageway 15 to which the outlet 7 is connected. Passageway 15 has a smaller diameter than chambers 13 and 14. An annular inlet seat 16 projects axially into the inlet chamber 13 at passageway 15 and similarly an annular exhaust seat 17 projects into the exhaust chamber 14. A valve poppet 18 is slidably disposed axially within the passageway 15 and includes a valve stem 19 mounted for coaxial movement through the passageway 15. A valve disc 20 is secured to the intermediate portion of the valve stem 19 within chamber 13 for selective engagement with the annular inlet seat 16 and a similar valve disc 21 is secured to the end of the stem 19 within the exhaust chamber 14 for selective seating upon the annular exhaust seat 17. Discs 20 and 21 have cutaway edge portions to reduce the effective area below the cross sectional areas of the corresponding chambers. The discs 20 and 21 are spaced slightly in excess of the spacing between the seats 16 and 17 such that the one valve closed, the opposite end of the passageway is held open.

The stem 19 projects axially through the inlet chamber 13 and is secured at its free end to a diaphragm 23 in any suitable manner. The diaphragm 23 spans the inlet chamber 13 immediately outwardly of the inlet line 3 and defines a pressure or diaphragm control chamber 24. The diaphragm 23 is a suitable flexible member having an annular convolution 25 projecting outwardly into the control chamber 24. The area of the diaphragm 23 which spans the complete inlet chamber is greater than the area of the adjacent valve discs 20. Consequently, with the control chamber 24 open to exhaust, as subsequently described, the inlet pressure in chamber 13 forces the diaphragm 23 into chamber 24 to hold the valve disc 20 from seat 16 to open the corresponding valve and disc 21 seated on seat 17 to close the corresponding valve. However, when inlet pressure is applied to the chamber 24, as hereinafter described, the pressure on diaphragm 23 is equalized and the pressure on disc 20 moves the stem 19 to reverse the position of the valves.

The valve 9 is constructed in a manner similar to that of valve 6 except that the inlet and outlet chambers are reversed. Thus, the valve 9 includes an inlet chamber 26 and an exhaust chamber 27 formed at the opposite ends of a housing 28. An inlet chamber connecting line 29 interconnects the inlet chamber 13 of the valve 6 to the inlet chamber 26 of the valve 9. Similarly, an exhaust chamber connecting line 30 interconnects the exhaust chamber 14 and exhaust chamber 27. Chambers 26 and 27 are interconnected by a valve passageway 31 having similar valve seats 32 and 33 in the respective chambers 26 and 27. A valve poppet 34 includes a valve stem 35 axially movable within the valve passageway 31. A valve disc 36, similar to discs 19 and 20, is secured to the one end of the stem 36 within chamber 26 and a similar valve disc 37 is secured to the stem 36 within the exhaust chamber 27. In valve 9 the valve stem 35 projects into and through the exhaust chamber 27 as at 38 and is secured to the diaphragm 39 which spans the exhaust chamber outwardly of the connecting line 30 to define a pressure or diaphragm control chamber 40. The diaphragm 39 is similar to a diaphragm 23 and includes an annular convolution 41 which projects however inwardly into the exhaust chamber 27. Thus, the second valve 9 corresponds generally in structure to the first valve except that the exhaust and inlet chambers in the respective sections are reversed in construction. A valve control line 42 interconnects the diaphragm control chambers 24 and 40 to each other and to a common control connecting line 43 which is connected to the pilot valve unit 2. Additionally, an exhaust control line 44 and an inlet control line 45 are connected to the valve unit 2 for selective coupling thereby to the connecting line 13.

The pilot valve unit 2 includes a valve housing 46 defining a pilot valve chamber 47 having a lateral side opening connected to the line 43 and a bottom inlet opening connected to line 45. Housing 46 includes an upper projection or extension 48 and includes an opening connected to the exhaust control line 44. A ball check unit 49 is slidably mounted within the pilot valve housing 46 and includes a ball check 50 within chamber 47 and a positioning stem 51 secured to the ball 50 and projecting upwardly and axially through the housing extension 48. The incoming line pressure transmitted via the line 45 urges the check ball 50 upwardly into engagement with the lower end of the housing 48 to seal the corresponding passageway to the line 44. The line pressure is thus transmitted from line 45 via line 43 to the chambers 24 and 40 to establish the position shown in FIGURE 1.

The opposite or second position of the valve system is established by positively depressing and holding the ball check unit 49 in the lower position with check ball 50 closing the inlet line 45, through suitable actuation of an electromagnetic actuator 52.

Figure 2:
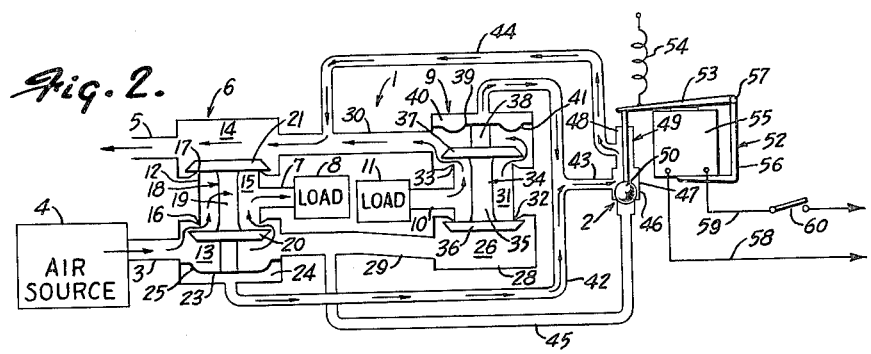
FIG. 2 is a view similar to FIGURE 1 showing the alternate position of the valve system created by operation of an electromagnetic pilot operator.
Figures 3, 4:
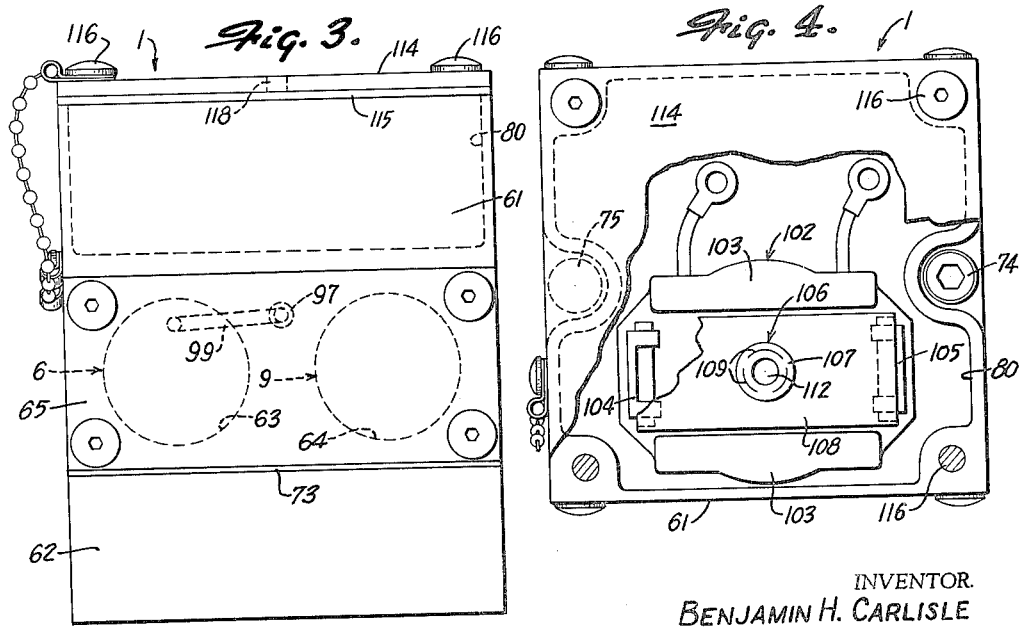
FIG. 3 is a side elevational view with parts broken away and sectioned to show the inner components of a preferred compact assembly of the valve systems shown in FIG. 1 and 2.
FIG. 4 is top view of FIG. 3 with the cover partially removed to show details of construction.

As diagrammatically shown in FIGS. 1 and 2, the actuator 52 includes an operating armature 53 partially overlying the upper end of the stem 51 and urged in slightly spaced relation thereto by a spring 54. A control winding 55 is mounted within a suitable magnetic frame 56 with armature 53 pivotally connected as a part of the frame 56 as at 57 and extends over the control winding 55 with the outer end overlying the stem 51. Incoming power leads 58 and 59 are connected to the control winding at a suitable control power source, not shown. A control switch 60 is inserted in the lead 59 for selective energization of the winding 55.

With electromagnetic actuator 52 deenergized, the valve unit 1 assumes the position shown in FIGURE 1, as follows. Spring 54 holds armature 53 retracted to allow upward movement of stem 51 of the pilot valve unit 2. The incoming line pressure from source 4 is transmitted through the valve chamber 13 and connecting passage 29 to the chamber 26. It is also transmitted via line 45 through the pilot valve unit 2 to line 43 and therefrom into the chambers 24 and 40.

In the first valve section 6, equal pressures are applied on opposite sides of the diaphragm 23 and consequently the incoming line pressure acts directly on the valve disc 20 to urge the valve poppet 18 upwardly to close the opening to the passage 15 and the outlet 7. In valve section 9, however, the diaphragm 46 is in the exhaust chamber and consequently, the incoming line pressure acts within the control chamber 40 and forces the diaphragm to move the valve poppet 34 oppositely and close the communication between the exhaust chamber 27 and the valve pasageway 31 and simultaneously to hold the disc 36 in spaced relation to the valve inlet seat 32 and thereby allowing the incoming fluid and pressure in chamber 26 to pass through the passageway 31 and the outlet 10 to the load 11.

This position is maintained as long as the electro-magnetic operator 52 is de-energized.

When the operator 52 is energized, the armature 53 is attracted by the winding 55, engages the valve stem 51 and positively moves the check ball 50 downwardly into sealing engagement with the opening connected line 45, as shown in FIG. 2.

As a result, the input pressure of source 4 is disconnected from the control chambers 24 and 40 of valves 6 and 9 respectively. Simultaneously, the downwardly movement of the check ball 50 interconnects the control chamber passage 43 to the exhaust control line 44 such that the chambers 24 and 40 are exhausted into the line 30 and thus outwardly through the exhaust chamber 14 of valve 6 and the exhaust outlet line 5.

In valve 6, the line pressure in chamber 13 acts directly against the diaphragm 23 and as a result the greater area of diaphragm 23 with respect to disc 20 moves the valve poppet 18 downwardly in FIG. 2 to connect the passageway 15 to the inlet chamber 13 and simultaneously to close the exhaust chamber 14 from the passageway 15. As a result, pressure is transmitted via passageway 15 and outlet 7 to the load 8.

In valve 9, the inlet pressure 36 acts directly on the valve disc 36 to cause the valve poppet 34 to move in a direction opposite to that of valve poppet 18 with the fluid in chamber 40 exhausting outwardly through the connecting line 43, the pilot valve unit 2, line 44 and exhaust passageway 30, exhaust chamber 14 to exhaust outlet 5. As a result, the valve system assumes the position shown in FIG. 2.

The illustrated valve system is preferably interconnected in an integrated valve unit generally such as that shown in FIGS. 3–7, inclusive. For purposes of simplicity and clarity of explanation, certain of the corresponding chambers shown in FIGS. 1 and 2 are similarly numbered in FIGS. 3–5 with additional elements numbered to more clearly illustrate the preferred construction.

Referring to FIGS. 3–7, the illustrated embodiment of the invention includes a common valve housing or body 61 having the valve sections 6 and 9 formed in side-by-side relation in the lower portion thereof and with the pilot valve unit 2 housed within a recessed upper portion. Housing 61 is mounted on a base 62 for connection of the intake pressure line 3, the exhaust line 5 and the load lines 7 and 10, not shown in FIGS. 3–7.

Referring particularly to FIGS. 5 and 6, valve body 61 is a square metal block having horizontal bores 63 and 64 extending through the block and with the opposite ends enlarged to form the valve chambers as described with respect to FIGS. 1 and 2 and correspondingly numbered in FIGS. 3–7. Valve poppets 18 and 34 are mounted within the bores 63 and 64 for selectively engaging the valve closure members or discs 20 and 21 with corresponding seats 16 and 17 and the valve closure members or discs 36 and 37 with corresponding seats 32 and 33. Lateral passageways corresponding to lines 29 and 30 are integrally formed therein and interconnect the inlet chambers 13 and 26 and exhaust chambers 14 and 27, as shown in FIG. 5. The sides of body 61 adjacent the opening of bores 63 and 64 are notched or recessed to receive end closure plates 65 and 66 which are secured thereto by suitable bolts. The diaphragms 23 and 39 are clamped between the respective end plates 65 and 66 and the adjacent portions of the block body 61 to overlie the ends of bores 63 and 64. The end plates 65 and 66 are provided with similar recesses 67 and 67' respectively, properly aligned with bores 63 and 64 and in cooperation with the respective diaphragms 23 and 39 defines the control chamber 24 aligned with chamber 13 of valve 6 and control chamber 40 aligned with chamber 27 of valve 9, as in FIGS. 1 and 2.

An intake opening 69 is provided extending downwardly through the housing 61 from the enlarged end of bore 63 forming intake chamber 13. An exhaust opening 70 is similarly provided from the exhaust chamber 14 in the opposite end of bore 63. Load openings 71 and 72 are respectively provided extending downwardly from the centers of bores 63 and 64 and thus from the passageways 15 and 31, respectively.

The pipe base 62 is secured to the underside of the valve housing 61 with a sealing gasket 73 therebetween by suitable attachment bolts 74 and 75 on opposite sides of housing 61.

Diaphragms 23 and 39 are similarly secured to the stem extensions of valve poppets 18 and 34 by end clamping members 68 and 68' respectively, to function in accordance with the description of FIGS. 1 and 2.

An L-shaped intake opening 76 extends inwardly from one side of the base 62 and then upwardly into alignment with the intake opening 69 in the housing 61 to supply pressurized air fluid to the chamber 13 of the first valve section 6. An exhaust opening 77 is similarly formed in the base 62 parallel to opening 76 and aligned with exhaust chamber 14 and terminates in alignment with the lower exhaust opening 70 of housing 61. A pair of load connecting openings or passageways 78 and 79 are provided in the base 62 extending inwardly from the opposite side from openings 76 and 77 and terminate in alignment with the load openings 71 and 72, respectively for establishing the connections to the outlet lines 7 and 10 as in FIGS. 1 and 2.

In the embodiments of FIGS. 3–7, the electro-magnetic actuator 52 of pilot valve unit 2 is mounted within a recess or cavity 80 in the top portion of the housing 61 between bores 63 and 64 and adjacent the lateral passageway 29. Pilot valve unit 2 is formed within the housing adjacent the base of the cavity 80. A vertical opening corresponds to and constitutes the line 45 interconnecting the lateral opening passageway 29 to the pilot valve unit 2 and particularly the main chamber thereof formed as an upwardly projecting enlargement as at 81 of the opening 29.

Referring to FIGS. 6 and 7, a cylindrical lower pilot seat 82 and a cylindrical upper pilot seat 83 are clamped within the enlarged opening 81 between the lower shoulder 84 and a circular retainer 85 which engages the upper pilot seat 83 and snaps into a suitable groove in the adjacent end portion of the enlarged opening 81. The lower pilot seat 82 includes a main chamber 86 and an pilot intake opening 87 formed as a stepped bore therethrough. The seat 82 includes an intermediate flange 88 spacing the seat from wall of opening 81 and defining an annular chamber 89 connected to main chamber 86 by a plurality of circumferentially distributed opening 90.

The upper pilot valve seat 83 is similarly spaced from the sidewall of opening 81 by opposite end flange 91 and 92 to define an exhaust chamber 93 connected to a control exhaust passageway or port 94 by circumferentially distributed openings 95. The diameter of passageway 94 is smaller than the main chamber 86 of the lower pilot valve seat 82 and constitutes the exhaust opening from the latter. O-ring seals 95 and 96 are disposed to opposite sides of chamber 86 between the wall of the pilot opening 81 and the aligned seat to seal the chamber 89.

A ball and stem unit 49 corresponding to FIGS. 1 and 2 is slidably disposed within the pilot valve 2 with the ball 50 disposed within chamber 86 to alternately engage the adjacent ends of ports 87 and 94. The stem 51 of unit 49 projects upwardly and is slidably disposed within a suitable journal or guide 96 in the base of the upper pilot seat 83. The upper end of stem 51 is coupled to the actuator 52.

A pair of passageways 97 and 98 extend laterally in opposite directions from the chamber 89 adjacent the lower seat 82 to the opposite end plates 65 and 66. Connecting passages 99 and 100 are formed by grooves on the inner face of the respective end plates 65 and 66 connecting the corresponding passageways 97 and 98 to the respective valve control chambers 24 and 40. An exhaust passageway 101 corresponding to the line 44 of FIGS. 1 and 2 is provided in the valve housing extending laterally from the exhaust chamber 93 of the upper pilot seat 83 and terminating in communication with the passageway 30 which connects the exhaust chambers 14 and 27 of the main valves 6 and 9.

The electromagnetic actuator 52 of FIGS. 1 and 2 is mounted within the cavity 80 in the upper portion of the solid integral block housing 61. The illustrated actuator in FIGS. 3–7 includes a generally rectangular coil frame 102 having upper side projections 103 which is clamped within the cavity as hereinafter described. The operating coil 55 is mounted within the frame 102 with suitable shading coils 104 and 105 to insure proper operation of the apparatus. An armature assembly 106 is movably mounted within the coil 55 and includes a cylindrical core 107 which is slidably mounted within the coil 55. An upper armature plate 108, generally corresponding to the diagrammatically illustrated armature 53 of FIGS. 1 and 2, is secured to the upper end of core 107 at at 109, as most clearly shown in FIG. 7 and is guided for vertical movement between the upper side projections 103 of frame 102.

A biasing spring 110 is mounted within the tubular magnetic core 107 with coil retainers or plungers 111 and 112 disposed at the opposite ends thereof to retain the spring within the core. The lower end of the core 107 is aligned with and receives the upper end of stem 51 which projects upwardly into engagement with the lower plunger 112.

A coil spring 113 encircles the core 107 between the frame 102 and the underside of plate 108 to hold the core in a raised position when coil 55 is de-energized. When the coil 55 is energized, the plate 108 is electromagnetically attracted to compress the spring 113 and move the core 107 downwardly, thereby forcing the stem 51 downwardly.

The electromagnetic operator unit 52 is clamped within the assembly by an upper cover 114, with a suitable gasket 115 interposed therebetween, by suitable attachment bolts 116 or the like.

Additionally, an interlocking leaf spring 117 is interposed between the bottom of frame 102 and the base of the cavity 80 to resiliently urge the frame upwardly. The cover 114 forces the frame 102 downwardly to compress spring 117 and hold the assembly in an operative position, such that the movement of plate 108 upon energizing of coil 55 is sufficient to move the stem 51 downwardly to hold valve ball 50 in sealing engagement with the pilot valve intake opening 87. When cover 114 is removed, spring 117 moves the frame 102 upwardly such that energizing of coil 55 and the resulting movement of plate 108 is insufficient to actuate the pilot valve unit 2.

Cover 114 includes an access opening 118 aligned with the core 107 and permits access to the upper plunger 112 for manual operation of the pilot valve 2 with a suitable rod or tool, not shown.

Generally, the operation of the invention illustrated in FIGS. 3–7 corresponds to the operation previously described with respect to FIGS. 1 and 2. Thus, with the winding 55 de-energized, the line pressure is transmitted to the intake port 87 of pilot valve unit 2, as shown in FIG. 7 and forces the stem 51 upwardly against the lower spring retainer or plunger 111 and causes it to move upwardly compressing the bias spring 110. The apparatus then assumes the same condition as that shown in FIG. 1 with the fluid path being described with respect to FIG. 5 as follows. The incoming air passes through the intake port 76 of base 62 and inlet opening 69 of housing 61 to the chamber 13 of valve 6 and then through the connecting passageway 29 to chamber 26 of valve 9. The air also passes to the intake port 87 of pilot valve 2 through the connecting passageway 45 from lateral passageway 29.

In the de-energized state of the operator 52, the pilot valve 2 opens and the air is transmitted via the passageways 97 and 98 shown in FIGS. 6 and 7 and the connecting lateral passageways 99 and 100 in the end plates 65 and 66 to the respective valve chambers 24 and 40. Consequently, the first valve 6 has similar air pressure on opposite sides of the diaphragm 23 and the valve poppet 18 is moved to close the connection of chamber 13 and passageway 15 and open the connection of passageway 15 and chamber 14, thereby connecting the load opening or port 78 to the exhaust chamber 14 and thus to exhaust port 77. In the valve 9 however, the diaphragm 39, defining chamber 40, is subjected to the line pressure within the chamber 40 and to the exhaust pressure on the opposite side within the exhaust chamber 27 of the valve 9. As a result, the valve poppet 34 moves in the opposite direction of poppet 18 and opens the connection of intake chamber 26 to passageway 31 and thus transmits the air to the load port 72 and therefrom to the associated load. The movement of poppet 34 also closes the connection of passageway 31 to the corresponding exhaust chamber 27.

When the winding 55 is energized, the armature plate 108 is attracted and the core 107 moves downwardly. The spring 110 is compressed and creates a force equal to the line pressure and further movement results in simultaneous downward movement of the spring 110 and the stem 51. The ball 50 is then forced into sealing engagement with the inlet seat found by inlet port 87 and blocks the transfer of pressure from the inlet to the control chambers 24 and 40. The latter chambers are then connected through the pilot valve unit 2 to the exhaust of line or passage 44 of FIGS. 1 and 2 formed by passages 97, 98 and 99, 100, and therefrom to the lateral passageway 30 of the main valves 6 and 9 through the pilot valve exhaust chamber 94 and the passageway 101. The chambers 24 and 40 are thus free to communicate through the exhaust chamber 14 to exhaust ports 70 and 77. As a result, in valve 6 the line pressure acts on the diaphragm 23 and forces the valve poppet 18 to move toward chamber 24 and carries the valve closure numbers or discs 20 and 21 in the corresponding direction to open the inlet side and close the exhaust side of the valve 6 with respect to valve outlet passageway 15. As a result, the incoming fluid pressure is transmitted to the ports 71 and 78 and therefrom to the load 8, as in FIGS. 1 and 2. Simultaneously, the line pressure acts on the disc 36 of poppet 34 in valve 9 and oppositely moves the valve poppet 34 toward the valve chamber 40 to close the inlet to the passageway 31 and to open the exhaust outlet from the passage 31 and thereby exhaust the fluid pressure from the load 11 connected to the base port 79 and thereby to valve port 72.

If it is desired to manually control the valve 1, the armature assembly of actuator 52 can be pushed inwardly by insertion of suitable pin, not shown, or similar device through the cover opening 118. If cover 114 is removed however, the interlock spring 117 pushes the actuator 52 outwardly of the pilot valve 2 a sufficient distance such that energizing of the actuator cannot operate the pilot valve 2.

The present invention thus provides a small compact four-way valve which is selectively positioned by the incoming line pressure in accordance with positioning of the small pilot valve.

Various modes of carrying out the invention are contemplated as being within the scope of the following claims particularly pointing out and distinctly claiming the subject matter which is regarded as the invention.

I claim:

1. A four-way valve unit, comprising,
    (a) a valve housing having a plurality of ports including an intake port for connection to an incoming pressurized line, an exhaust port and a pair of load ports disposed between the intake port and the exhaust port, a pair of shiftable double poppet valves in the housing and each having spaced valve members to opposite sides of one of the load ports to open and close a connection of one of said load ports to said intake and exhaust ports, said poppet valves having inlet chambers connected to the intake port and having valve positioning members therein subjected to the incoming pressure at said intake port and being biased to a first position by the incoming pressure to open one load port connection and to close the other load port connection, and
    (b) means including a pilot valve for connection to a fluid pressure source and to the positioning means and establishing an opposing hydraulic force on the valve positioning members for selectively and simultaneously shifting said poppet valves against said incoming pressure to reverse the connection of the load ports.

2. A four-way valve unit, comprising,
    (a) a connection base having at least four separate passageways each of which extends from a common face to a different face, the passageways in the common face being aligned in two laterally spaced pairs,
    (b) a valve housing mounted in sealed relation to said common face and having a plurality of ports aligned with the passageways terminating in the common face to define similar spaced pairs, a pair of shiftable double poppet valves in the housing each having valve stems aligned with one of the spaced pairs and arranged to oppositely positioned to open and close said ports, said poppet valves being biased to a first position by the incoming pressure,
    (c) an electromagnetic pilot valve mounted within the housing and coupled to the poppet valves and having a separable electromagnetic actuator for selectively and simultaneously shifting said poppet valves against said incoming pressure, (d) a resilient means disposed between the actuator and the housing and urging said electromagnetic actuator outwardly into an inoperable position relative to said pilot valve, and (e) releasable means secured to the housing over said electromagnetic actuator and holding the actuator within the housing against the force of the resilient means within the housing in operable connection to said pilot valve.

3. A four-way valve unit, comprising, (a) a pair of double poppet valves each having a poppet with a pair of valve closure members for alternate engagement with a pair of valve seats, said valves each having an intake chamber for connection to an incoming pressurized line and controlled by the first valve member and an exhaust chamber controlled by the second valve member, said valve members being subjected to the incoming pressure at the intake chamber and urged by the incoming line pressure in the intake chambers to a first position, (b) a control chamber having a diaphragm forming a common end wall of the control chamber and the intake chamber of one valve, said diaphragm being coupled to the valve poppet of the corresponding valve and being of a greater area than the valve member whereby line pressure only in the intake chamber moves the valve poppet in one direction and line pressure on both sides of the diaphragm moves the valve in the opposite direction, (c) a control diaphragm having a diaphragm forming a common end wall of the control chamber and the exhaust chamber of the other valve, said last named diaphragm being coupled to the valve poppet of the second valve in the exhaust chamber and being greater in area than the valve member in the intake chamber of the second valve whereby line pressure in the second diaphragm chamber operates to move the closure members against the force of the incoming line pressure, and (d) a pilot valve for connection to a fluid pressure source and to the control chambers for selectively and simultaneously applying a pressure at least as great as the line pressure to the control chambers for reverse positioning of said valve poppets.

4. A four-way valve unit comprising, (a) a pair of double poppet valves each having a poppet with a pair of valve closure members for alternate engagement with a pair of valve seats, each of said valves having a load passageway connected to an intake chamber for connection to an incoming pressurized line and controlled by the first valve member and to an exhaust chamber controlled by the second valve member, said valve poppets having means subjected to line pressure and urged by incoming line pressure to close the intake chamber connection in one valve and open the intake chamber connection in the opposite valve, (b) a control diaphragm coupled to the valve poppet of one valve in the intake chamber and defining a control chamber, (c) a control diaphragm coupled to the valve poppet of the second valve in the exhaust chamber and defining a control chamber, and (d) a pilot valve for connection to a fluid pressure source and to the control chambers for selectively and simultaneously applying a pressure at least as great as the line pressure to each diaphragm for simultaneous reverse positioning of said valve poppets.

5. A four-way fluid actuated valve unit, which comprises, (a) a first valve having an intake chamber and an exhaust chamber on opposite ends of an outlet passageway, a diaphragm means forming an end wall of the intake chamber and defining a control chamber, a valve poppet movable axially in said outlet passageway and having a valve stem carrying an intake valve disc in said intake chamber and an exhaust valve disc in said exhaust chamber, said discs being oppositely positioned in and out of engagement with the corresponding ends of the outlet passageway, (b) means securing said valve stem to said diaphragm, (c) a second valve having an intake chamber and an exhaust chamber on oposite ends of an outlet passageway, a diaphragm means forming an end wall of the exhaust chamber and defining a control chamber, a valve poppet movable axially in said outlet passageway and having a valve stem carrying an intake valve disc in said intake chamber and an exhaust valve disc in said exhaust chamber, said discs being oppositely positioned in and out of engagement with the corresponding ends of the outlet passageway, (d) means securing the valve stem of the second valve to the corresponding diaphragm, (e) a first passageway connecting the intake chambers of the valves, (f) a second passageway connecting the exhaust chambers of the valves, (g) a third passageway means connecting the control chambers of the first and second valves, (h) a pilot valve having an inlet connected to the first passageway and an outlet connected to the secone passageway and an inlet-outlet connected to the third passageway and a ball check alternately positioned to close the pilot valve inlet and outlet, and (i) control means coupled to the ball check for selectively positioning of said ball check.

6. The valve unit of claim 5 wherein said control means is an electromagnetic actuator and has an armature coupled to said ball check.

7. A four-way valve unit, comprising, (a) a valve base having an intake passageway for connection to an incoming pressurized line and, an exhaust passageway, a first load passageway and a second load passageway terminating in a common planar face, (b) a valve housing secured with a planar mounting face in sealed engagement with the common planar face and having correspondingly aligned passageways; a pair of spaced, parallel bores extending through the housing and terminating in aligned enlarged end chambers at corresponding opposite ends of each bore; lateral passageways connecting the aligned end chambers and with the intake passageway communicating with one end chamber of one bore and the exhaust passageway communicating with the opposite end chamber of the opposite bore, (c) end closure plates secured to the housing sealing the opposite ends of the pair of bores, (d) a pair of diaphragms secured one each between each closure plates and the housing, (e) the one end closure plate sealing the chamber communicating with the intake passageway and having a recess aligned with the chamber to define a diaphragm control chamber, (f) the opposite end closure plate having a recess aligned with the end chamber communicating with the exhaust passageway of the opposite bore to define a diaphragm control chamber, (g) a pair of valve poppets slidably mounted one each in said bores and each having valve closure members in the corresponding end chambers to alternately close the opposite ends of the bore adjacent the bases of the end chamber, said closure members having a smaller effective area than said diaphragms, (h) means securing said valve poppets to the corresponding diaphragm, and
(i) a pilot valve means for connection to a fluid pressure source and to the control chambers for selectively and simultaneously connecting the intake port and the exhaust port to said control chambers for moving said valve poppets in opposite directions.

8. The four-way valve unit of claim 7 wherein said pilot valve means is located within the housing and includes,
(a) a pilot intake port connected to the lateral passageway connected to the end chamber connected to the intake passageway,
(b) a pilot exhaust port connected to the opposite lateral passageway,
(c) control passageways extending through the housing and the end closure plates to the control diaphragm chambers, and
(d) a valve closure means to selectively and alternately close the pilot intake port and the pilot exhaust port.

9. In a four-way valve unit,
(a) a housing having a pair of parallel bores extending therethrough with the opposite ends enlarged to define end chambers and having valve seats in the base of the end chambers, the aligned end chambers at one end constituting intake chambers connected by a first lateral passageway and the aligned end chambers at the opposite end constituting exhaust chambers connected by a second lateral passageway, said housing having a pair of parallel load ports extending one each from the central portion of the pair of bores and having an air intake port connected to one intake chamber and an exhaust port connected to the exhaust chamber,
(b) valve poppets slidably disposed in each bore and having discs disposed in the opposite end chambers to alternately engage the corresponding valve seats,
(c) valve closure plates secured to the housing to seal the bores and having diaphragms interposed between each closure plate and the housing, the closure plate adjacent one intake ported chamber having a recess aligned therewith and the opposite closure plate having a recess aligned with the exhaust chamber of the other bore, said diaphragm having a greater effective area than the corresponding discs of said valve poppets,
(d) a pilot valve chamber in the housing between and above said bores and adjacent the first lateral passageway and having an intake port connected to the first lateral passageway, first operating and second passageways extending from the pilot valve chamber in opposite directions to the end closure plates and then through the closure plates to the corresponding control chamber, an exhaust passageway extending from the pilot valve chamber in spaced relation to operating passageways to the second lateral passageway,
(e) a valve assembly in said pilot valve chamber having a valve ball check axially movable to alternately close the intake port and the exhaust passageway and alternately connect the operating passageways to the exhaust passageway and the intake port and having a ball stem projecting outwardly in sliding seated arrangement from the pilot valve chamber, the pressure in the intake chamber urging the ball upwardly to open the pilot intake port and close the pilot exhaust passageway, and
(f) an actuator secured within a cavity in the housing and operatively coupled to the outer end of the stem.

10. The valve unit of claim 9 having,
(a) a resilient means interposed between the actuator and the base of the cavity and urging the actuator outwardly to operatively decouple it from the stem, and
(b) a holding means releasably secured to the housing and releasably holding the actuator against the force of the resilient means to operatively couple the actuator to the stem.

11. The valve unit of claim 10 having,
(a) said holding means constituting a cover secured to the housing overlying the cavity, and
(b) said cover having access means aligned with the actuator to permit manual positioning of the actuator and consequent operation of the pilot valve, 12. In a four-way valve unit,
(a) a rectangular housing having a pair of parallel bores extending therethrough with the opposite ends enlarged to define end chambers and having valve seats in the base of the end chambers and having a pilot valve cavity in the exterior wall surface, the aligned end chambers at one end constituting intake chambers connected by a first lateral passageway and the aligned end chambers at the opposite end constituting exhaust chambers connected by a second lateral passageway, said housing having a pair of parallel load ports extending one each from the central portion of the pair of bores and an intake port connected to a intake chamber and an exhaust port connected to an exhaust chamber,
(b) valve poppets slidably disposed in each bore and having discs disposed in the opposite end chambers to alternately engage the corresponding valve seats,
(c) valve closure plates secured to the housing to seal the bores and having diaphragms interposed between each closure plate and the housing, the closure plate adjacent one intake ported chamber having a recess aligned therewith and the opposite closure plate having a recess aligned with the exhaust chamber of the other bore,
(d) a pilot valve chamber in the housing between and above said bores and adjacent the first lateral passageway and having an intake port connected to the first lateral passageway, first and second load passageways extending from the pilot valve chamber in opposite directions to the end closure plates and then through the closure plates to the corresponding control chambers, an exhaust passageway extending from the pilot valve chamber in spaced relation to the load passageways to the second lateral passageways,
(e) a valve assembly in said pilot valve chamber having a valve ball check axially movable to alternately close the intake port and the exhaust passageway and alternately connect the load passageways to the exhaust passageway and the intake port and having a ball stem projecting outwardly in sliding sealed arrangement from the pilot valve chamber to the cavity, the pressure in the intake port urging the ball upwardly to open the pilot intake port and close the pilot exhaust passageway,
(f) an electromagnet secured within a cavity in the housing and having a resiliently mounted armature operatively coupled to the outer end of the stem,
(g) a resilient means interposed between the electromagnet and the base of the cavity and urging the electromagnet upwardly to operatively decouple the armature from the stem,
(h) a cover secured to the housing overlying the cavity and clamping the electromagnet against the force of the resilient means to operatively couple the armature to the stem, and
(i) said cover having an opening means aligned with the armature to permit manual positioning of the armature and consequent operation of the pilot valve.

13. A valve assembly, comprising,
(a) a valve housing having a main valve means including means urging it to a first valve position and a pilot valve unit for charging the valve means to a second valve position and having a cavity aligned with the pilot valve unit, said pilot valve unit having a movable control member urged outwardly into the cavity, (b) an electromagnetic actuator in the cavity, said actuator including an operating coil and a tubular magnetic core slidably disposed within the coil and releasably engaging said pilot valve control member, spring means coupled to the coil and urging the coil outwardly to hold the core in operative relation to the pilot valve control member, and (c) a valve body cover releasably secured overlying said pilot cavity and clamping said coil therein and compressing said spring means to hold the core in operative engagement with the control member.

14. A line pressure actuated valve unit comprising, (a) a valve body having a pair of valves formed therein in side-by-side parallel relation and said body having a pilot valve cavity to one side of the valves, (b) each of said valves comprising a first chamber and a second chamber at opposite ends of a connecting outlet in the body, the first chambers of the valves opening in a first wall of the body and the second chambers of the valves opening in a second wall of the valve body and valve load passageways communicating with individual lateral openings from each outlet passageway, said valve body having first and second transfer passageways interconnecting the first chambers of the valves and the second chambers of the valves, said first chambers constituting the intake side of the valves and said second chambers constituting the exhaust side of the valves, (c) control chamber members secured one each to said opposite walls and aligned one with the first chamber of one valve and one with the second chamber of the opposite valve and having laterally extending control passageways, (d) flexible diaphragms spanning the chambers of the valves to define a common wall between the corresponding control chambers and valve chambers of the valves, (e) said valve body having a pilot valve chamber extending between the first transfer passageway from the pilot valve cavity and having a valve chamber with an intake port, an exhaust port and an operating port therebetween connected respectively to the intake side of the valves, the exhaust side of the valves and the control chambers, said chamber including valve seats at the intake port and the exhaust port with a valve check member disposed within the chamber between the valve seats and having an operating stem projecting axially outwardly of the chamber into the pilot cavity and said member being alternately seated to connect the pilot operating port to the pilot intake port and to the pilot exhaust port, (f) an electromagnetic actuator in the pilot recess, said actuator including a coil frame having a central opening aligned with the pilot valve chamber and a concentric operating coil secured therein, a magnetic core slidably disposed within the coil and including an armature plate secured to the outer end of the core, the core being aligned with and engaging the outer end of said stem, a resilient means disposed between the armature plate and the coil frame urging the coil outwardly of the stem, a resilient means disposed between the frame and the base of the recess and urging the frame outwardly, and (g) a valve body cover releasably secured overlying said pilot cavity and clamping said coil frame within the recess and compressing said resilient means to hold the plunger in operative engagement with the stem.

References Cited by the Examiner

UNITED STATES PATENTS

| | | | |
|---|---|---|---|
| 1,302,538 | 5/1919 | Gulick | 137—413 |
| 2,633,871 | 4/1953 | Parsons | 137—596.17 |
| 2,970,611 | 2/1961 | Hoge | 137—596.16 |
| 3,038,500 | 6/1962 | Lansky et al. | 137—596.15 |
| 3,043,335 | 7/1962 | Hunt | 137—596.15 |
| 3,126,915 | 3/1964 | Hunt | 137—625.64 X |
| 3,134,395 | 5/1964 | Glasgow | 137—625.5 X |

M. CARY NELSON, *Primary Examiner.*

HENRY T. KLINKSIEK, *Examiner.*